H. S. PARMELEE.
Fire Extinguisher.
No. 9,352.
Reissued Aug. 24, 1880.
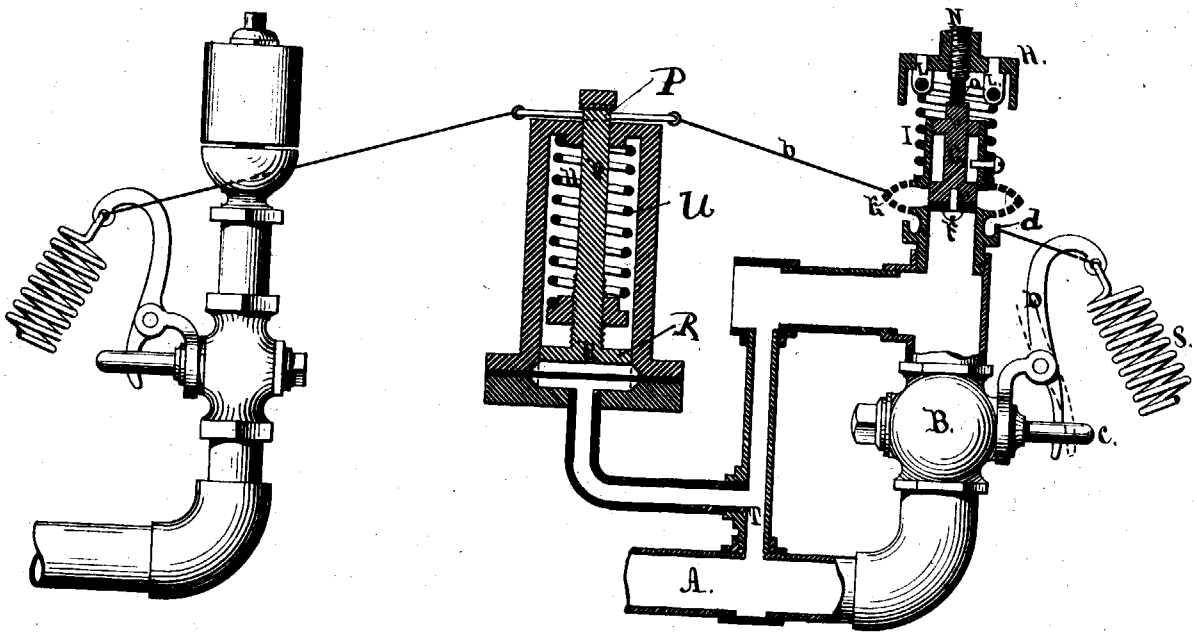
WITNESSES:
J. A. Miller Jr
Wm. L. Cofin
INVENTOR:
Henry S. Parmelee
by Joseph A. Miller
Atty

UNITED STATES PATENT OFFICE.

HENRY S. PARMELEE, OF NEW HAVEN, CONNECTICUT.

FIRE-EXTINGUISHER.

SPECIFICATION forming part of Reissued Letters Patent No. 9,352, dated August 24, 1880.

Original No. 154,076, dated August 11, 1874. Application for reissue filed May 28, 1880.

*To all whom it may concern:*

Be it known that I, HENRY S. PARMELEE, of New Haven, in the county of New Haven and State of Connecticut, have invented a new Improvement in Fire-Extinguishers; and I do hereby declare that the following, when taken in connection with the accompanying drawing and the letters of reference marked thereon, to be a full, clear, and exact description of the same, and which drawing constitutes part of this specification, and represents a sectional view of the apparatus.

This invention relates to a device for attachment to distributing-pipes in buildings for extinguishing fires, the construction being such that the heat which may be generated in the apartment will automatically open the valve and allow the discharge of water.

The invention consists, first, in a shield or cover by which the fusible material is protected from a flow of water, that the heat may the more readily act thereon; second, in a device, in connection with the distributing-pipes, whereby the full flow of water will be automatically let on so soon as one or more valves are open, and, in connection with the last-named device, an alarm to be automatically sounded.

A is the main pipe, by which the water or other extinguishing fluid is conducted to the different points. In this pipe is a valve, B, by which the flow of water is cut off, the valve-stem being held out in a closed position through a lever, D, as more fully hereinafter described.

E is the sprinkler, which consists of a hollow chamber numerously perforated, so that water passing into the said chamber under pressure will be forced therefrom in numerous jets.

F is a valve standing below the chamber to prevent the flow of water to the chamber. G, the valve-stem, extends up, and over this a cap, H, is arranged, bearing upon the said spindle. Around the valve-chamber is a spiral spring, I, the spring being attached to the cap H by connecting devices L. These connecting devices are of a material which will fuse at a comparatively low temperature—say at 150° or 200° of heat.

Through the cap is an adjusting-screw, N, which bears upon the spindle, so that by turning the screw N the pressure of the spring may be brought to bear upon and hold down the valve. The strength of this spring should be a little greater than the maximum pressure of the water, or whatever the fluid may be.

The sprinklers E are arranged in different parts of the apartment whenever it may be desirable to discharge the water, and the water supplied thereto under pressure. If at any time a fire occurs in the apartment, so soon as the heat has become so great as to fuse the connecting devices L on any one of the distributers the pressure above the valve will be removed, and the water will then force the valve up, pass into the sprinklers E, and be thrown therefrom in jets.

In order that the jets from one sprinkler may not fall upon the connecting devices L, and thus prevent the subsequent fusing of these plugs by the continuation of the fire, the cap extends down so as to inclose the connecting devices L, and prevents the water from one sprinkler entering the connecting devices of another.

There is liable to be more or less drip from the sprinklers by leakage from the valves. To prevent this from running down or dropping, a cup, *d*, is arranged beneath the sprinkler E, into which the drip will pass, and then may be wiped out, or, if a small quantity, it will evaporate.

In order to prevent the cold water, with which the valve F is always in contact, from communicating its low degree to the cap H, and thereby prevent as early a fusion of the connecting devices L as there would otherwise be, I place between the valve-stem and the cap a non-conducting material, *a*.

The valve B is employed to cut off the principal communication between the pipe A and the distributers; and in order that the valve B may be opened to allow a full supply of water whenever a fire occurs, I attach the valve-lever D to the rod P of the piston R by means of a wire, *b*. When the piston drops, a spring, S, will draw the lever D forward and open the valve. The piston R is held up to secure the valve, and its action made automatic, in the following manner: From the supply-pipe below the valve B a tube, T, of less area than one of the sprinklers, leads to beneath the piston R, and also to the pipe above the valve to which the several sprinklers are attached. A spring, U, bears upon the piston R with a pressure less than that of the water. Hence when the sprinklers are closed the piston will be held up with the full pressure of water; but so soon as one sprinkler-valve is raised, then the pressure between that valve and the sprinkler will be reduced, because the supply through the tube T will be less than the capacity of the sprinkler; hence the pressure beneath the piston will be correspondingly reduced, and the pressure above the piston will force it down, releasing the connection between the piston and the lever D, so that the valve will be instantly opened to furnish the full supply.

In order to sound an alarm when the sprinkler is open, a steam-whistle is connected to the piston-rod P in like manner as to the valve in the supply-pipe described, and as also seen in the drawing. Hence whenever the sprinkler is open the alarm will be sounded.

I have represented the alarm as being that of a steam-whistle; but any other alarm which may be tripped or made by disconnection, as described, may be employed. This alarm will be sounded if a leak should occur at any point, if that leak be larger than the tube T.

If desirable, fusible metal may be placed between the valve-stem and the screw N. In that case the connecting devices L may be a hard or non-fusible metal, it only being essential that a fusible material be placed at some point to sustain the pressure upon the valve until fused.

It will be apparent that when a fire breaks out the whole available water-supply will be concentrated on the fire, as only those distributers are open which are in the vicinity of the fire, where the temperature has been raised sufficiently to fuse the solder.

Having thus described my invention, I claim as new and desire to secure by Letters Patent—

1. The combination, with a system of distributers constructed to release the water automatically by the action of heat on a fusible material, of a valve controlling the water-supply, substantially as described.

2. The combination, with a system of distributers constructed to relieve the water automatically by the action of heat on a material fusible at a low temperature and a valve controlling the water-supply, of an alarm adapted to be operated automatically when the distributers are in operation, substantially as set forth.

3. The combination, with a system of automatic fire-extinguishers, of a valve controlling the water-supply, a wire for retaining the valve in a closed position, and devices for automatically releasing the strain on the wire and allowing the valve to open, substantially as set forth.

4. The combination, with a system of automatic fire-extinguishers and an alarm, of devices for operating the alarm by the diminution of pressure in the water-supply pipes, substantially as set forth.

5. The combination, with a perforated distributer attached to a water-supply pipe and a valve governing the flow of water to the perforated distributer, of connecting devices made of material fusible at a low temperature, and connected with the valve by a flexible connection and adapted to automatically release the valve when the temperature is raised sufficiently to fuse said connecting devices, substantially as set forth.

6. In combination with the sprinkler E, valve F, spring I, and fusible supports, the cap H, extending down around the said supports, substantially as and for the purpose specified.

7. In combination with the sprinkler E, valve F, spring I, and the fusible connecting devices, the adjusting-screw N and non-conducting material *a*, substantially as set forth.

8. In combination with the supply-pipe A and distributing-pipes, the valve B between the supply and distributing pipes, and the tube T, communicating from the supply-pipe below the valve to the distributing-pipe above and to the piston R, the said piston provided with a spring, U, and connected to the said valve B, all substantially as and for the purpose described.

9. An automatic fire-extinguisher consisting of a distributer and a valve placed within the distributer, constructed to be released by the action of heat on a material fusible at a low temperature, so as to admit the water to the distributer.

HENRY S. PARMELEE.

Witnesses:
JOSEPH A. MILLER,
J. A. MILLER, Jr.